(12) United States Patent
Querner et al.

(10) Patent No.: US 9,054,355 B2
(45) Date of Patent: Jun. 9, 2015

(54) CATALYST WITH METAL OXIDE DOPING FOR FUEL CELLS

(75) Inventors: Claudia Querner, Ludwigshafen (DE); Stefan Kotrel, Bedminster, NJ (US); Ekkehard Schwab, Neustadt (DE); Oemer Uensal, Mainz (DE); Sigmar Braeuninger, Hemsbach (DE)

(73) Assignee: BASF SE, Ludwigshafen (DE)

( * ) Notice: Subject to any disclaimer, the term of this patent is extended or adjusted under 35 U.S.C. 154(b) by 319 days.

(21) Appl. No.: 13/497,626

(22) PCT Filed: Sep. 22, 2010

(86) PCT No.: PCT/EP2010/063944
§ 371 (c)(1),
(2), (4) Date: Mar. 22, 2012

(87) PCT Pub. No.: WO2011/036165
PCT Pub. Date: Mar. 31, 2011

(65) Prior Publication Data
US 2012/0178018 A1    Jul. 12, 2012

(30) Foreign Application Priority Data
Sep. 22, 2009 (EP) ..................... 09170900

(51) Int. Cl.
  *H01M 4/92* (2006.01)
  *H01M 4/88* (2006.01)
  *H01M 4/90* (2006.01)
  *H01M 8/10* (2006.01)
  *H01M 4/86* (2006.01)

(52) U.S. Cl.
  CPC .......... *H01M 8/1002* (2013.01); *H01M 4/8605* (2013.01); *H01M 4/8647* (2013.01); *H01M 4/8803* (2013.01); *H01M 4/8825* (2013.01); *H01M 4/90* (2013.01); *H01M 4/9075* (2013.01); *H01M 4/9083* (2013.01); *H01M 4/921* (2013.01); *H01M 4/925* (2013.01); *H01M 4/926* (2013.01); *Y02E 60/521* (2013.01)

(58) Field of Classification Search
None
See application file for complete search history.

(56) References Cited

U.S. PATENT DOCUMENTS

| | | | |
|---|---|---|---|
| 2005/0112451 | A1 | 5/2005 | Lee et al. |
| 2006/0099483 | A1 | 5/2006 | Min et al. |
| 2006/0257719 | A1 | 11/2006 | Merzougui et al. |
| 2008/0254974 | A1 | 10/2008 | Nakano et al. |
| 2009/0081528 | A1 | 3/2009 | Nakano et al. |
| 2009/0142640 | A1 | 6/2009 | Cai et al. |

FOREIGN PATENT DOCUMENTS

| | | |
|---|---|---|
| CN | 1783558 A | 6/2006 |
| CN | 1990101 A | 7/2007 |
| DE | 10 2008 023 781 | 11/2008 |
| JP | 2006-114299 A | 4/2006 |
| JP | 2008-251413 A | 10/2008 |

OTHER PUBLICATIONS

U.S. Appl. No. 13/278,792, filed Oct. 21, 2011, Uensal, et al.
U.S. Appl. No. 13/278,830, filed Oct. 21, 2011, Uensal, et al.
International Search Report issued on Feb. 16, 2011 in PCT/EP10/63944 filed on Sep. 22, 2010.
Chinese Office Action issued Mar. 5, 2014 in Patent Application No. 201080052585.1 (English Translation only).
Decision for Refusal issued Feb. 23, 2015, in Japanese Patent Application No. 2012-530247 filed Sep. 22, 2010 (with English translation).

*Primary Examiner* — Sarah A Slifka
(74) *Attorney, Agent, or Firm* — Oblon, McClelland, Maier & Neustadt, L.L.P.

(57) ABSTRACT

The invention relates to a catalyst for fuel cells which comprises a support, at least one catalytically active metal from the platinum group or an alloy comprising at least one metal of the platinum group and also at least one oxide of at least one metal selected from among Ti, Sn, Si, W, Mo, Zn, Ta, Nb, V, Cr and Zr. The invention further relates to a process for producing such a catalyst and its use.

23 Claims, No Drawings

CATALYST WITH METAL OXIDE DOPING FOR FUEL CELLS

The invention relates to a catalyst for fuel cells which comprises a support, at least one catalytically active metal from the platinum group or an alloy comprising at least one metal of the platinum group and also at least one oxide of at least one metal selected from among Ti, Sn, Si, W, Mo, Zn, Ta, Nb, V, Cr and Zr. The invention further relates to a process for producing such a catalyst and its use.

Fuel cells are electrochemical cells which have been developed for both mobile and stationary generation of electric power. In a fuel cell, the principle of electrolysis is reversed. Various types of fuel cells which generally differ from one another in terms of the operating temperature are known today. However, the structure of the cells is in principle the same in all types. They are generally made up of two electrode layers, an anode and a cathode, at which the reactions proceed and an electrolyte in the form of a membrane between the two electrodes. This membrane has three functions: it establishes ionic contact, prevents electrochemical contact and also ensures that the media supplied to the electrode layers are kept separate. The electrode layers are generally supplied with gases or liquid which are reacted in a redox reaction. For example, the anode is supplied with hydrogen or methanol and the cathode is supplied with oxygen. To ensure this, the electrode layers are usually contacted with electrically conductive gas diffusion layers. These are, for example, plates having a grid-like surface structure made up of a system of fine channels.

To operate the fuel cell, gaseous and liquid fuels which are able to provide protons are used. Examples comprise hydrogen and methanol, with hydrogen being preferred. The hydrogen is supplied to the anode of the fuel cell. Oxygen (in the form of atmospheric oxygen) is the cell oxidant and is supplied to the cathode of the cell. The electrodes are usually made of porous conductive materials such as woven graphite fabrics, graphitized layers or carbon paper in order to allow the fuel to be distributed over the surface of the membrane facing the fuel supply electrode. Each electrode comprises finely divided catalyst particles (for example platinum particles on a support) which are usually applied to carbon particles in order to aid ionization of hydrogen at the anode and reduction of oxygen at the cathode. Protons flow from the anode through an internally conductive polymer membrane to the cathode where they combine with oxygen to form water which is carried out from the cell. Conductor plates conduct the electrons formed at the anode away.

A significant problem in fuel cells of the prior art is, for example, the decrease in conductivity during prolonged operation or cyclic loading during normal motor vehicle operation. A considerable part of this decrease in performance is associated with damage to the oxygen reduction electrode catalyst. This damage is probably due to a combination of mechanisms which alter the properties of the originally produced catalyst and its support.

To reduce the decrease in performance of a catalyst over time, US 2006/0257719 A1 proposes using titanium oxide- and carbon-supported electrodes onto which platinum is deposited as catalyst. The platinated titanium oxide particles are mixed with carbon particles in order to form the electrocatalyst.

A further challenge is to increase the specific activity of the catalysts of the fuel cells in order to achieve higher efficiencies. For this purpose, US 2005/0112451 A1, for example, proposes using metal oxide/carbon mixtures as support material. The proportion of the carbon support is in the range from 1 to 80% by weight, and the proportion of the metal oxide is greater than 20% by weight.

It is an object of the present invention to provide a catalyst which is suitable, in particular, for the cathodic reduction of oxygen in fuel cells and displays an improved specific activity and also a high long-term stability. A further object of the invention is to provide a process for producing such a catalyst.

The object is achieved by a catalyst comprising
 (A) a support,
 (B) at least one catalytically active metal from the platinum group or an alloy comprising at least one metal of the platinum group and also
 (C) at least one oxide of at least one metal selected from among Ti, Sn, Si, W, Mo, Zn, Ta, Nb, V, Cr and Zr,
wherein the proportion of the at least one metal of the at least one oxide (C), based on the sum of the percentages by weight of the components (A), (B) and (C), is in the range from 0.01 to 0.9% by weight.

It has surprisingly been found that the introduction of the at least one metal oxide (C) in a very small proportion allows the specific activity of the catalyst in respect of the oxidation reduction reaction to be increased by up to 100%. This advantageously makes it possible to reduce the amount of the at least one catalytically active metal or the at least one catalytically active alloy, which brings considerable cost savings without the performance being adversely affected. With a view to reducing the costs of the overall system while maintaining at least the same performance, reduction of the noble metal loading, particularly in the case of platinum, is of great importance for industrial and economical use of electrocatalysts in fuel cells. The proportion of the at least one metal of the at least one oxide (C) is generally in the range from 0.01 to 0.9% by weight, preferably in the range from 0.1 to 0.65% by weight, particularly preferably in the range from 0.2 to 0.6% by weight. The at least one metal is 1 metal or a mixture of 2, 3, 4, 5 or more of the metals mentioned.

The at least one metal oxide with which the catalyst is doped according to the invention is at least one oxide of at least one metal selected from among Ti, Sn, Si, W, Mo, Zn, Ta, Nb, V, Cr and Zr or a mixed oxide of the abovementioned metals. The at least one oxide is preferably an oxide selected from among $ZrO_2$, $SnO_2$ and $TiO_2$. Particular preference is given to the oxides $TiO_2$ and $ZrO_2$.

To achieve a sufficiently good catalytic activity, it is necessary for the catalyst of the invention to have a large specific surface area. This is achieved by the catalyst comprising a support on which the at least one catalytically active metal or the corresponding alloy and also the at least one metal oxide are deposited. To achieve a large surface area, it is preferred that the support is porous. Suitable materials which can be used as support are, for example, carbon or ceramics. A further suitable support material is, for example, γ-aluminum oxide, which may be coated with carbon.

A particularly preferred support material is carbon or carbon modified with nitrides and/or carbides of the metals W, Mo, Ti and Ta or impregnated carbon. An advantage of carbon as support material is that it is electrically conductive. When the catalyst is used as electrocatalyst in a fuel cell, for example as cathode of the fuel cell, it is necessary for it to be electrically conductive in order to ensure the function of the fuel cells. The carbon used as support is, in a preferred embodiment of the invention, present as activated carbon, carbon black, graphite or nanostructured carbon. Suitable carbon blacks are, for example, high-surface-area carbon blacks such as Vulcan® XC72 and Ketjen Black® EC300 or carbon blacks having a low surface area such as Denka Black®. When the carbon is present as nanostructured carbon, preference is given to using carbon nanotubes. Preference is also given to supports composed of graphenes.

The proportion of the at least one support, component (A), can be varied over a wide range and is generally in the range from 49.1 to 89.99% by weight, preferably in the range from 69.1 to 79.99% by weight, based on the sum of the percentages by weight of the components (A), (B) and (C).

According to the present invention, the at least one catalytically active metal is selected from the platinum group or is an alloy comprising one or more of the metals of the platinum group.

According to the invention, metals of the platinum group are rhodium, iridium, nickel, palladium, platinum, copper, silver and gold. In a preferred embodiment of the invention, the metal of the platinum group is platinum or palladium.

In a further embodiment of the invention, the catalyst of the invention comprises a catalytically active alloy comprising at least one metal of the platinum group and, if appropriate, a transition metal. The transition metal is, in a preferred embodiment of the invention, selected from the group consisting of nickel, vanadium, chromium and cobalt.

In a preferred embodiment of the invention, the alloy comprised by the catalyst as component (B) is selected from the group consisting of PtNi, PtFe, PtV, PtCr, PtTi, PtCu, PtPd, PtRu, PdNi, PdFe, PdCr, PdTi, PdCu and PdRu.

For the purposes of the invention, an alloy is a homogeneous, solid solution of at least two different metals, with one element being referred to as base element and the other(s) being referred to as alloying element(s). The base element is the element which has the greatest proportion by mass within the alloy. In the case of alloys comprising the same base elements and the same alloying elements, different phases are produced by a different composition. Thus, the proportions of the alloying elements in the base element differ in the individual phases. It is even possible, if appropriate, for the proportion of the base element to be smaller than the proportion of at least one alloying element in a phase.

The proportion of the at least one catalytically active metal or the at least one catalytically active alloy, component (B), is generally in the range from 10 to 50% by weight, preferably in the range from 20 to 30% by weight, based on the sum of the percentages by weight of the components (A), (B) and (C).

The figures given for the percentages by weight of the components (A), (B) and (C) are based on the sum of the percentages by weight of the components (A), (B) and (C) without taking into account residual moisture, should the catalyst not having been dried completely, in particular under reduced pressure, and impurities.

In the production of the catalyst of the invention, the at least one catalytically active metal or the at least one catalytically active alloy and also the at least one metal oxide are deposited on the support. This is preferably carried out in solutions. For this purpose, it is possible, for example, for metal compounds to be dissolved in a solvent. The corresponding metal or the metals of the alloy can be bound covalently, ionically or by complexation. It is also possible for the metal to be deposited reductively as precursor or under alkaline conditions by precipitation of the corresponding hydroxide. Further possibilities for deposition of the catalytically active metal are impregnation with a solution comprising the metal, chemical vapor deposition (CVD) or physical vapor deposition (PVD) processes and also all further processes known to those skilled in the art by means of which a metal can be deposited. Preference is given to a salt of the at least one catalytically active metal being precipitated first and the at least one metal oxide being subsequently or simultaneously deposited on the support. This is followed by drying and, if appropriate, heat treatment to produce the catalyst comprising the at least one catalytically active metal or the at least one catalytically active alloy and the at least one oxide.

The invention thus provides a process for producing a catalyst as defined above, which comprises the steps
(a) deposition of the at least one catalytically active metal from the platinum group on the support and
(b) deposition of the at least one hydrolyzable precursor compound of the at least one metal oxide on the support and
(c) if appropriate, carrying out of a heat treatment.

Process steps (a) and (b) can be carried out in succession or in parallel, with process step (b) also being able to be carried out before process step (a). In general, the catalytically active metal is deposited on the support first and the oxide dopant is then applied. Likewise, in a preferred embodiment of the invention, the oxide precipitation and the application of the catalytically active metal can be carried out simultaneously. In a further embodiment of the invention, the at least one hydrolyzable precursor compound is deposited on the support first and the at least one catalytically active metal from the platinum group is then deposited on the support.

In a preferred embodiment of the invention, the support comprising the at least one catalytically active metal after process step (a) is mixed with at least one transition metal and/or a further catalytically active metal and the at least one hydrolyzable precursor compound of the at least one metal oxide is deposited in a subsequent process step (b) before the heat treatment in step (c) is carried out.

In a further preferred embodiment of the invention, the support comprising the at least one catalytically active metal after process step (a) is mixed with at least one transition metal and/or a further catalytically active metal. The heat treatment, process step (c), is subsequently carried out and the at least one hydrolyzable precursor compound of the at least one metal oxide is then deposited in process step (b).

In another preferred embodiment of the invention, the at least one hydrolyzable precursor compound is deposited on the support in process step (b), the at least one catalytically active metal is subsequently deposited and the support is mixed with at least one transition metal and/or a further catalytically active metal in process step (a). The heat treatment, process step (c), is subsequently carried out.

In the case of compounds which comprise the at least one catalytically active metal or the transition metal are preferably complexes, in particular metal-organic complexes in which the metal of the platinum group or the transition metals is complexed. The metal is preferably selected from the group consisting of platinum, titanium, iron, chromium, ruthenium, cobalt, nickel and palladium.

Preferred ligands for forming the metal-organic complexes are olefins, preferably dimethyloctadiene, aromatics, preferably pyridine, 2,4-pentanedione. Furthermore, it is also preferred that the at least one metal is in the form of a mixed cyclopentadienyl-carbonyl complex or as a pure or mixed carbonyl, phosphane, cyano or isocyano complex.

Particular preference is given to the transition metal being present as metal-organic complex with acetylacetonate or 2,4-pentanedione as ligand. The transition metal is preferably present in ionic form.

In a further embodiment of the invention, the at least one compound comprising the at least one catalytically active metal of the platinum group and/or the at least one compound comprising the at least one transition metal is present as a thermally decomposable compound in the dry state. However, it is, as an alternative, also possible for the thermally decomposable compound(s) to be dissolved in a solvent. The solvent is preferably selected from the group consisting of water, ethanol, hexane, cyclohexane, toluene and ether compounds. Preferred ether compounds are open-chain ethers, for example diethyl ether, di-n-propyl ether or 2-methoxypropane, and also cyclic ethers such as tetrahydrofuran or 1,4-dioxane.

The mixing of the support with the at least one compound comprising the at least one catalytically active metal from the platinum group and, if appropriate, with the at least one compound comprising the at least one transition metal in process step (a) is carried out by any method known to those skilled in the art for the mixing of solids. Suitable solids mixers usually comprise a vessel in which the material to be mixed is moved. Suitable solids mixers are, for example, paddle mixers, screw mixers, hopper mixers or pneumatic mixers.

When the compound(s) is/are present in a solvent, mixing is carried out by means of a customary dispersing process. This is carried out using, for example, a vessel in which fast-rotating knives or blades are comprised. A suitable apparatus is, for example, an Ultra Turrax®.

In process step (b), at least one hydrolyzable precursor of the at least one metal oxide is deposited on the support. The deposition is preferably effected by hydrolysis of a hydrolyzable precursor compound of the at least one metal oxide. Such hydrolyzable precursor compounds are known to those skilled in the art. The hydrolyzable precursor compound of the at least one metal oxide is, for example, an alkoxide or an alcohol-soluble metal salt or an alcohol-soluble complex which in combination with water forms sparingly soluble oxides or hydroxides which after addition of water or in the presence of water precipitate onto the support.

The at least one metal oxide is usually not alloyed with the platinum. The size of the metal oxide particles on the catalyst of the invention can vary over a wide range. The particles are generally smaller than 8 nm, preferably smaller than 5 nm.

To produce an alloy of the metal of the platinum group and, if appropriate, the second metal selected from among the metals of the platinum group or the transition metals, the mixture obtained by mixing in process step (a) is heated. For this purpose, the mixture obtained in process steps (a) and (b) is brought to a temperature in the range from 90 to 900° C., preferably in the range from 350 to 900° C., more preferably in the range from 400 to 800° C. and in particular in the range from 400 to 700° C., in a furnace. The heating decomposes the at least one complex and liberates the metal bound therein. In the case of alloy formation, the metal combines with the further metal of the platinum group or the transition metal. This gives an alloy in which the respective metal crystallites are present side by side in a disordered fashion. The individual metal crystallites generally have a size in the range from 2 to 7 nm.

In a preferred embodiment, the heat treatment is carried out in two temperature stages, with the temperature of the first temperature stage being lower than the temperature of the second temperature stage. It is also possible for heating to be carried out in more than two temperature stages. The temperature of a subsequent temperature stage is usually higher than the temperature of the preceding temperature stage. However, it is also possible for heating to be carried out in two temperature stages.

The heat treatment in step (c) can be carried out either batchwise or continuously, for example in a rotary tube.

In a preferred embodiment, the heat treatment in step (c) is carried out batchwise, with the mixture produced in steps (a) and (b) firstly being heated under inert gas, for example a nitrogen or argon atmosphere, at a temperature in the range from 100 to 350° C., preferably from 200 to 300° C., for a period of from 1 to 10 hours, preferably from 2 to 5 hours, usually from 3 to 4 hours. The gas mixture is then changed to a reducing atmosphere and the second temperature stage is set. The temperature of this second temperature stage is generally from 350 to 800° C. and preferably from 550 to 650° C.; the residence time is generally in the range from 1 to 10 hours, usually in the range from 2 to 6 hours, preferably about 3 hours. The furnace is then slowly cooled to room temperature under an inert gas atmosphere and the catalyst is passivated.

In a further preferred embodiment, the heat treatment in step (c) is carried out continuously, with the mixture produced in steps (a) and (b) firstly being installed in a stock container upstream of the furnace and being flushed under inert gas, for example under nitrogen or argon. The continuous furnace can have various heating zones, with preference being given to it having at least two heating zones.

When heating in step (c) is carried out in two temperature stages in continuous operation, preference is given to the temperature of the first temperature stage (heating zone) being in the range from 300 to 500° C., preferably in the range from 350 to 450° C. and in particular in the range from 400 to 450° C., and the temperature of the second temperature stage (heating zone) being in the range from 500 to 700° C., more preferably in the range from 550 to 650° C. and in particular in the range from 600 to 650° C. The temperature of the second temperature stage is preferably at least 100° C. higher, more preferably at least 150° C. higher, than the temperature of the first temperature stage.

The residence time in the continuous furnace in step (c) is preferably in the range from 30 minutes to 10 hours, more preferably in the range from 45 minutes to 5 hours and in particular in the range from 1 to 2 hours.

Heating of the alloy precursor in step (c) is preferably carried out under a reducing atmosphere. The reducing atmosphere preferably comprises hydrogen. The proportion of hydrogen is dependent on the composition of the catalyst to be produced. The proportion of hydrogen in the reducing atmosphere can be from 2 to 100% by volume. Preference is given to using a forming gas atmosphere in which the concentration of hydrogen is usually less than 30% by volume, generally less than 20% by volume. The proportion of hydrogen in the reducing atmosphere is particularly preferably in the range from 2 to 15% by volume and in particular about 5% by volume. Especially in the production of a Pt—Ni catalyst or a ternary catalyst comprising PtNi or PtCo, the proportion of hydrogen in the reducing atmosphere is preferably in the range from 4 to 10% by volume, in particular about 5% by volume.

In addition to hydrogen, the reducing atmosphere preferably comprises at least one inert gas. The reducing atmosphere preferably comprises nitrogen. However, it is also possible, as an alternative, for argon, for example, to be used instead of the nitrogen. It is also possible to employ a mixture of nitrogen and argon. However, preference is given to nitrogen.

In particular, it is preferred that the reducing atmosphere comprises no further constituents in addition to the hydrogen and the inert gas. However, this should not rule out the presence of traces of further gases, for example as a result of the production of the gas.

After the heating to form the alloy in step (c), a passivation is preferably carried out. For this purpose, the alloy which has been produced is, for example, cooled to ambient temperature under an inert atmosphere. The inert atmosphere is preferably a nitrogen atmosphere or an argon atmosphere. It is also possible to use a mixture of nitrogen and argon. The alloy produced in step (c) can also be passivated, for example in the continuous embodiment, by introducing it into a water reservoir.

In a preferred embodiment, the catalyst of the invention is still free-flowing after it has been produced. To achieve this, it is not absolutely necessary for the catalyst to have been completely dried. A catalyst is generally still free-flowing when it has a residual moisture content of up to 50% by weight of water. The residual moisture content of the catalyst of the invention is particularly preferably in the range from 10 to 30% by weight of water. A catalyst having a residual moisture content is obtained, for example, by air drying during production.

The catalyst produced according to the invention is suitable, for example, for use as electrode material in a fuel cell. A suitable field of use is electrooxidation of oxygen. The catalyst of the invention can also be employed for other electrochemical processes such as chloralkali electrolysis. In a particularly preferred embodiment, the catalyst of the invention is used for an electrode in a polymer electrolyte fuel cell (PEFC), also known as proton exchange membrane fuel cell. The electrode for which the catalyst is used is, in particular, a cathode of the polymer electrolyte fuel cell. When used as cathode of a polymer electrolyte fuel cell, the catalyst of the invention displays a surprisingly high activity in respect of the oxygen reduction reaction.

In a further preferred embodiment, the catalyst of the invention is used as cathode catalyst in a high-temperature phosphoric acid fuel cell.

EXAMPLES

Production Examples

Comparative Example C1

Production of a Platinum Catalyst (~50% by Weight of Pt)

5 g of Vulcan XC72 were suspended in 500 ml of water and homogenized for 15 minutes by means of an Ultra Turrax® T25 at 8000 rpm. 8.55 g of $Pt(NO_3)_2$ were dissolved in 100 ml of water and added to the carbon black dispersion. 200 ml of $H_2O$ and 800 ml of ethanol were subsequently added. The mixture was refluxed under nitrogen for 6 hours. The catalyst was filtered off and washed free of nitrate with 2.5 l of hot water.

Catalysts having a platinum content of 47% by weight and crystallite sizes (XRD) of 3.1 nm were obtained. The electrochemical surface area (determined by CO stripping) was 71.4 $m^2$/g of platinum.

Comparative Example C2

Production of a Platinum Catalyst (~30% by Weight of Pt)

5 g of Vulcan XC72 were suspended in 500 ml of water and homogenized for 15 minutes by means of an Ultra Turrax® T25 at 8000 rpm. 3.66 g of $Pt(NO_3)_2$ were dissolved in 100 ml of water and added to the carbon black dispersion. 200 ml of $H_2O$ and 800 ml of ethanol were subsequently added. The mixture was refluxed under nitrogen for 6 hours. The catalyst was filtered off and washed free of nitrate with 3 l of hot water.

Catalysts having a platinum content of 28.4% by weight and crystallite sizes (XRD) of 1.9 nm were obtained. The electrochemical surface area (determined by CO stripping) was 136 $m^2$/g of platinum.

Comparative Example C3

Production of $TiO_2$-doped (5% by Weight) Platinum Catalysts 5 g of Vulcan XC72 were suspended in 500 ml of ethanol (absolute) and homogenized for 15 minutes by means of an Ultra Turrax® T25 at 8000 rpm. 3.56 g of $Ti[OCH(CH_3)_2]_4$ were dissolved in 50 ml of ethanol and added to the carbon black dispersion, as was a further 200 ml of ethanol. A total of 800 ml of aqueous platinum solution (8.55 g of $Pt(NO_3)_2$) were added to the carbon black dispersion and the mixture was refluxed under nitrogen for 6 hours. The catalyst was filtered off and washed free of nitrate with 2.5 l of hot water.

Catalysts having a platinum content of 41% by weight and a titanium content of 5.0% by weight (corresponding to 8.3% by weight of $TiO_2$) were obtained. The crystallite size of the Pt nanoparticles determined by means of XRD was 2.6 nm. The electrochemical surface area (determined by CO stripping) was 62.9 $m^2$/g of platinum.

Comparative Example C4

Production of Platinum Catalysts Having a $TiO_2$ Content of 33.5% by Weight 2.5 g of Vulcan XC72 were suspended in 500 ml of water and homogenized for 15 minutes by means of an Ultra Turrax® T25 at 8000 rpm. 8.55 g of $Pt(NO_3)_2$ were dissolved in 100 ml of water and added to the carbon black dispersion. Rinsing with 200 ml of water was subsequently carried out. 17.86 g of $Ti[OCH(CH_3)_2]_4$ were dissolved in a total of 700 ml of ethanol and slowly introduced directly into the reaction solution (under reflux). The mixture was refluxed under nitrogen for 6 hours. The catalyst was filtered off and washed free of nitrate with 2.5 l of hot water.

Catalysts having a platinum content of 38% by weight and a titanium content of 20.1% by weight (corresponding to 33.5% by weight of $TiO_2$) were obtained. The crystallite size of the Pt nanoparticles determined by means of XRD was 2.9 nm, and that of the $TiO_2$ particles (anatase) was 5.0 nm. The electrochemical surface area was 23 $m^2$/g of platinum.

Comparative Example C5

Production of a Platinum-Nickel Catalyst 23 g of a Pt catalyst produced as described in comparative examples 1 and 2 (19.5% by weight of Pt, 22% by weight of $H_2O$; i.e. calculated for dry catalyst: 25% by weight of Pt) were dry-mixed with 8.9 g of nickel acetylacetonate, installed in a rotary tube furnace (HTM Reetz 700-110-500) and flushed with nitrogen for 1 hour. The catalyst mixture was then firstly dried at 110° C. (under nitrogen, 2 hours). For the alloying process, the furnace was heated to 210° C. (heating time: 30 minutes) and changed over to a reducing atmosphere using 0.8 l/h of $H_2$, 15 l/h of $N_2$. After a hold time of 4 hours at 210° C., the temperature was increased to 600° C. (heating time: 3 hours) and maintained at this temperature for a further 3 hours (under reducing conditions using 0.8 l/h of $H_2$, 15 l/h of $N_2$). The furnace was subsequently flushed with nitrogen again and slowly cooled to room temperature.

The catalyst was passivated and heated with 2 l of 0.5M $H_2SO_4$ at 90° C. for 1 hour in order to remove unalloyed nickel. Finally, the catalyst was filtered, washed with 3 l of hot water and dried.

The catalyst had a platinum content of 24.4% by weight and a nickel content of 3.1% by weight. This corresponds to a stoichiometric alloy composition of $Pt_{2.8}Ni$. The crystallite size of the PtNi nanoparticles determined by means of XRD was 2.7 nm.

Example 1

Production of $TiO_2$-Doped (0.5% by Weight) Platinum Catalysts 5 g of Vulcan XC72 were suspended in 500 ml of water and homogenized for 15 minutes by means of an Ultraturrax T25 at 10 000 rpm. 8.55 g of $Pt(NO_3)_2$ were subsequently dissolved in 100 ml of water and added to the homogenized carbon black dispersion, as were a further 200 ml of water. 0.36 g of $Ti[OCH(CH_3)_2]_4$ were subsequently dissolved in 800 ml of ethanol and added to the carbon black dispersion via a downcomer tube. The reaction mixture was subsequently refluxed for 6 hours. The catalyst formed was filtered off and washed free of nitrate with 2.5 l of hot water.

A catalyst having a platinum content of 46% by weight and a titanium content of 0.58% by weight (corresponding to 0.97% by weight of $TiO_2$) was obtained. The crystallite size of the platinum nanoparticles determined by means of XRD was 3.1 nm. The electrochemical surface area (determined by CO stripping) was 68.3 $m^2$/g of platinum.

Example 2

Production of $TiO_2$-Doped (0.5% by Weight) Platinum Catalysts 5 g of Vulcan XC72 were suspended in 500 ml of ethanol (absolute) and homogenized by means of an Ultraturrax T25 at 10 000 rpm. 0.36 g of $Ti[OCH(CH_3)_2]_4$ dissolved in 50 ml of ethanol were added to this carbon black suspension, as were a further 200 ml of ethanol. A total of 800 ml of aqueous platinum solution (8.55 g of $Pt(NO_3)_2$) were added to the carbon black dispersion and the mixture was refluxed under nitrogen for 6 hours. The catalyst obtained was filtered off and washed free of nitrate with 2.5 l of hot water.

Catalysts having a platinum content of 44% by weight and a titanium content of 0.59% by weight (corresponding to 0.98% by weight of $TiO_2$) were obtained. The crystallite size of the platinum nanoparticles determined by means of XRD was 2.9 nm. The electrochemical surface area (determined by CO stripping) was 70.9 $m^2$/g of platinum.

Comparison with example 1 shows that the electrochemical surface area of the platinum is higher when the metal oxide dopant and platinum are deposited simultaneously (example 2). In particular, the surface area increases very sharply with increasing oxide loading (see comparative examples C3 and C4), i.e. the platinum surface area available for catalysis is significantly smaller and the activity of the catalyst is correspondingly lower.

Example 3

Production of a $ZrO_2$-Doped (0.2% by Weight) PtNi Catalyst 0.34 g of $Zr[OC_4H_9]_4$ (80% in 1-butanol, Aldrich) was dissolved in 450 ml of ethanol. 7 g of Vulcan XC72 were added to the Zr solution and homogenized for 10 minutes by means of an Ultra Turrax® T25 at 8000 rpm. 100 ml of aqueous platinum solution (5.18 g of $Pt(NO_3)_2$, Heraeus) were added to the carbon black dispersion and the dispersion was dispersed once again by means of an Ultraturrax. The mixture was then transferred to a reactor with 1.4 l of water and refluxed under nitrogen for 6 hours. After cooling to room temperature, the catalyst was filtered off and washed free of nitrate with 3 l of hot water and dried.

The catalyst had a platinum content of 28.4% by weight and a zirconium content of 0.64% by weight. The crystallite size of the Pt nanoparticles determined by means of XRD was 2.0 nm.

To produce the $ZrO_2$-doped PtNi catalyst, 5 g of the above $ZrO_2$-doped Pt catalyst were mixed dry with 2.53 g of nickel acetylacetonate, installed in a rotary tube furnace (HTM Reetz 700-110-500) and flushed with nitrogen for 1 hour. The catalyst mixture was then firstly dried at 110° C. (under nitrogen, 2 hours). For the alloying process, the furnace was heated to 210° C. (heating time: 30 minutes) and changed over to a reducing atmosphere using 0.8 l/h of $H_2$, 15 l/h of $N_2$. After a hold time of 4 hours at 210° C., the temperature was increased to 600° C. (heating time: 3 hours) and this temperature was maintained for a further 3 hours (under reducing conditions) using 0.8 l/h of $H_2$, 15 l/h of $N_2$. The furnace was subsequently flushed with nitrogen again and slowly cooled to room temperature.

The catalyst was removed from the furnace under nitrogen, moistened with about 150 ml of water and subsequently heated with 550 ml of 0.5M $H_2SO_4$ at 90° C. for 1 hour in order to remove unalloyed nickel. Finally, the catalyst was filtered, washed with 2.5 l of hot water and dried.

The catalyst had a platinum content of 26.9% by weight, a nickel content of 2.7% by weight and a zirconium content of 0.2% by weight. This corresponds to a stoichiometric alloy composition of $Pt_3Ni$. The crystallite size of the PtNi nanoparticles determined by means of XRD was 2.7 nm.

Characterization

Example 4

Determination of the Catalytic Activity in Respect of the Oxygen Reduction Reaction and Possibility of Reducing the Platinum Loading The oxygen reduction reaction (ORR) was determined by measurement at a rotating disk electrode (RDE) in an oxygen-saturated electrolyte (1M $HClO_4$) (potential range: 50-950 mV; scanning speed: 20 mV/s).

The rotating electrode was coated with an amount of catalyst of about 40 µg/$cm^2$ for the oxygen reduction reaction measurement. The Pt loading varies from 8 to 20 µg of Pt/$cm^2$ as a function of the Pt content of the respective samples. As a direct comparison of the power, it is possible to compare, for example, the potential at a constant current density (−1 mA/$cm^2$) (see table 1), where: the higher the potential, the more active the catalyst since the overvoltage for the oxygen reduction reaction is correspondingly lower.

As an alternative, the current density at a particular potential can be compared. Since, in particular, the kinetic current in the potential range from about 800 to 1000 mV gives information about the catalytic activity (the steeper the current-potential curve, the lower the kinetic inhibition of the reaction and the better the catalyst), ORR activities were evaluated, usually at 0.9 V in accordance with the following formula, where $i_d$ is the limiting diffusion current and $i_{0.9\,V}$ is the current at 0.9 V. To compensate for different loadings, the values are normalized either in respect of the Pt amounts $m_{Pt}$ present or in respect of the Pt surface area present.

$$I_{0.9V} = \frac{i_d \cdot i_{0.9V}}{i_d - i_{0.9V}} \cdot \frac{1}{m_{Pt}}.$$

The platinum catalyst of comparative example C1 achieves a current density of −1 mA/cm² at a potential of 919 mV. A shift by 9 mV is observed as a result of the addition of 0.5% of $TiO_2$ (example 2). This corresponds to an increase in the activity per unit mass at 0.9 V from 129 mA/mg of Pt to 185 mA/mg of Pt (i.e. by more than 40%). An increase in the oxide concentration shows either barely any effect (5% of $TiO_2$, comparative example C3) or that the catalyst or the activity even deteriorates significantly (20% of $TiO_2$, comparative example C4). In the latter case a shift by 34 mV to lower potentials or a reduction in the activity per unit mass to 58 mA/mg of Pt, i.e. by more than 50%, is observed.

The significant reduction in the catalytic activity at high oxide loadings can be correlated directly with the reduced electrochemical platinum surface area. Thus, the platinum surface area determined by means of CO stripping for the catalyst produced as described in C3 (5% by weight of Ti as $TiO_2$) is only 63 m²/g of Pt, i.e. more than 10% lower than that of the pure platinum catalyst. With increasing oxide loading (e.g. as per C4, with 20% by weight of Ti as $TiO_2$), the platinum surface area decreases to less than one third (23 m²/g of Pt compared to 71 m²/g of Pt in the case of the undoped catalyst as per C1).

At oxide loadings above 0.9% by weight (cf. table 2, example with 0.95% by weight of Ti as $TiO_2$), the activity-increasing effect of the addition of oxide is no longer apparent (although the electrochemical surface area is reduced by only a few percent, i.e. in the range of measurement inaccuracy). The observed shift in the ORR curve by 1 mV (at a current density of −1 mA/mg of Pt) is in the range of measurement inaccuracy (see table 2). The activity per unit mass of the catalyst doped with metal oxide was less than 10% higher than that of the undoped catalyst, which in view of the measurement inaccuracy of the ORR measurement cannot be considered to be significant.

It has been found that, in general, Pt and PtNi catalysts which have metal oxide additions in the range above 0.9% by weight to about 5% by weight have virtually unchanged activities per unit mass compared to the undoped catalysts.

In addition, the prior art describes, for example, a thermal after-treatment of the catalysts under an inert atmosphere. For this purpose, the catalyst produced as described in C4 was, by way of example, heat treated under nitrogen (2 hours, 450° C.). Here, the catalytic activity in respect of oxygen reduction deteriorated further (to an activity per unit mass of 35 mA/mg of Pt). Analogous results were also obtained for other thermally after-treated catalysts, with both the thermal after-treatment under inert conditions (nitrogen) and that under reducing conditions (e.g. 5% of hydrogen in nitrogen) being examined.

These results show that the production steps mentioned in the prior art sometimes have highly adverse effects on the undoped catalysts. Thus, a high oxide loading reduces the catalytically active surface area to such an extent that the total activity of the system decreases greatly. A thermal after-treatment even at 450° C. reduces the activity further. At heat treatments up to 1000° C., as described in the literature, it can be expected that the catalyst would become virtually completely inactive.

The catalyst with 28.4% by weight of Pt produced as described in comparative example C2 displays, at the same catalyst loading (i.e. a lower platinum loading) an ORR curve which has been shifted to lower potentials in comparison with C1. Based on the amount of platinum, the activity per unit mass is 134 mA/mg of Pt and thus very similar to the catalyst produced as described in C1.

The addition of 0.5% by weight of Ti (as $TiO_2$) leads to an increase in the activity per unit mass to 256 mA/mg of Pt (i.e. by over 90%). Although only 60% of the active composition (Pt) compared to C1 is present on the electrode, the activity is not only similar but even higher (see table 1, 927 mV compared to 919 mV). Similar results were obtained for a catalyst which had been produced analogously but contained only 20% by weight of Pt and 0.5% by weight of Ti (activity per unit mass: 244 mA/mg of Pt) and was, with 40% of the active mass compared to C1, shifted only slightly to lower potentials (914 mV compared to 919 mV).

Owing to the higher current density for the oxygen reduction reaction due to metal oxide doping, a decrease in the platinum content on the cathode side of a fuel cell can be achieved without impairment of performance.

TABLE 1

| Catalyst | Loading (μg of cat/cm²) | Pt loading (μg of Pt/cm²) | Potential at −1 mA/cm² (mV) |
|---|---|---|---|
| C1 (47% of Pt) | 41.5 | 19.5 | 919 |
| Example 2 (44% of Pt, 0.59% of Ti as $TiO_2$) | 42.7 | 20.0 | 928 |
| C3 (41% of Pt, 5% of Ti as $TiO_2$) | 44.2 | 18.5 | 921 |
| C4 (38% of Pt, 20% of Ti as $TiO_2$) | 40.7 | 15.4 | 885 |
| C5 (38% of Pt, 20% of Ti as $TiO_2$, heat treated under $N_2$) | 41.7 | 16.7 | 880 |
| 29.1% of Pt, 0.46% of Ti as $TiO_2$ (analogous to example 2) | 39.4 | 11.5 | 927 |
| 18.5% of Pt, 0.47% of Ti as $TiO_2$ (analogous to example 2) | 43.7 | 8.1 | 914 |

TABLE 2

| Catalyst | Loading (μg of cat/cm²) | Pt loading (μg of Pt/cm²) | Potential at −1 mA/cm² (mV) |
|---|---|---|---|
| C2 (28.4% of Pt) | 60.2 | 17.1 | 921 |
| Produced in a manner analogous to C3: 27.7% of Pt, 0.95% of Ti as $TiO_2$ | 61.4 | 17.0 | 922 |

Example 5

Determination of the Catalytic Activity of PtNi Catalysts in Respect of the Oxygen Reduction Reaction Using a method analogous to the procedure in example 4, ORR activities of PtNi and oxide-doped PtNi catalysts were determined. It is known from the prior art that alloys usually have high current densities for the oxygen reduction reaction. The PtNi catalyst produced as described in comparative example C4 has about 2.2 times the activity per unit mass of pure platinum catalysts (e.g. C1 or C2). Doping with metal oxide (e.g. with $ZrO_2$, as per example 4) can increase this further by over 75%. The two PtNi catalysts produced have a comparable Pt:Ni ratio of 75 atom % of Pt:25 atom % of Ni (stoichiometry: $Pt_3Ni$), so that activity differences can be attributed solely to the doping with metal oxide,

TABLE 3

| Catalyst | Activity per unit mass at 0.9 V (mA/mg of Pt) |
|---|---|
| C4 (25% of PtNi) | 284 |
| Example 4 (27% of PtNi, 0.2% of Zr as $ZrO_2$) | 500 |

Example 6

Ex-Situ Corrosion Test: Determination of the Catalytic Activity after Potential Cycling Test The stability of the catalyst system was estimated by comparison of the ORR activities before and after potential cycles (200× between 0.5 and 1.3 V). Both the stability of the Pt crystallites (lower potential range) and that of the support (potentials >1 V) are simulated by rapid cycling.

The ORR activity of the pure Pt catalyst (47% by weight) decreases by at least half (−50%) after these potential cycles. With increasing $TiO_2$ content, the corrosion resistance decreases; at about 20% by weight of $TiO_2$, virtually 75% of the original activity is lost. This is surprising insofar as the $TiO_2$ should itself not corrode and destabilization of the Pt particles is therefore presumed. In addition, the prior art describes the use of oxides for increasing the corrosion stability. The corrosion resistance of the catalysts can be increased by thermal after-treatment, in particular under nitrogen but also under reducing conditions, but the stability of the untreated $TiO_2$-free catalysts is not reached. In addition, this slight increase in the stability is associated, as described above, with a significant reduction in the activity.

At metal oxide doping levels according to the invention up to about 1% by weight, the corrosion stability is comparable to that of the oxide-free catalysts but the increase in the activity per unit mass is very large, which overall leads to an improvement in the catalysts.

At oxide additions of more than 1% by weight of $TiO_2$ and in particular more than 5% by weight, the catalysts have not only a reduced catalytic activity but also a significantly reduced corrosion resistance compared to oxide-free catalysts or catalysts having metal oxide doping levels of less than 0.9% by weight. These results are contrary to the teachings of the prior art.

Example 7

In-Situ Characterization

Finally, the increase in the catalytic activity was also evaluated by measurements in a fuel cell configuration. Specifically, we have used a catalyst according to the invention (as per example 1, 30% by weight of Pt, 0.5% by weight of Ti as $TiO_2$) on the cathode side of a high-temperature phosphoric acid fuel cell. As anode, use was made of a conventional 30% by weight Pt catalyst which was also used as reference on the cathode (e.g. as per comparative example C2). The measurement conditions were: 160° C., hydrogen to the anode and air to the cathode. As can be seen from the table below, an increase in activity is also found in-situ.

Apart from high-temperature applications, the catalyst of the invention can naturally also be used in other types of fuel cells, e.g. low-temperature Nafion-based PEMFCs, DMFCs, etc.

| Catalyst | Loading | Power at 0.2 A/cm² |
|---|---|---|
| 30% of Pt/XC72 (comparative example 2) | 1.1 mg of Pt/cm² | 128 ± 0.5 mW/cm² |
| 30% of Pt, 0.5% of Ti/XC72 (example 2) | 1.1 mg of Pt/cm² | 131 ± 0.5 mW/cm² |

The invention claimed is:

1. A catalyst, comprising:
   (A) a support;
   (B) at least one catalytically active metal selected from the group consisting of rhodium, iridium, nickel, palladium, platinum, copper, silver, and gold, or an alloy comprising at least one of said catalytically active metals; and
   (C) an oxide of at least one metal selected from the group consisting of Ti, Sn, Si, W, Mo, Zn, Ta, Nb, V, Cr, and Zr,
   wherein, based on a total weight of components (A), (B), and (C):
   a proportion of the at least one metal of the oxide (C) is in a range from 0.01 to 0.9% by weight;
   a proportion of component (B) is in a range from 10 to 50% by weight; and
   a proportion of component (A) is in a range from 49.1 to 89.99% by weight.

2. The catalyst of claim 1, wherein the support is selected from the group consisting of a carbon support, a polymer, and a ceramic.

3. The catalyst of claim 1, wherein (B) is an alloy selected from the group consisting of PtNi, PtFe, PtV, PtCr, PtTi, PtCu, PtPd, PtRu, PdNi, PdFe, PdCr, PdTi, PdCu, and PdRu.

4. A polymer electrolyte fuel cell comprising a cathode which comprises the catalyst of claim 1.

5. The catalyst of claim 1, wherein the metal oxide (C) comprises at least one selected from the group consisting of $ZrO_2$, $SnO_2$, and $TiO_2$.

6. The catalyst of claim 1, wherein the metal oxide (C) comprises $ZrO_2$.

7. The catalyst of claim 1, wherein the metal oxide (C) comprises $TiO_2$.

8. The catalyst of claim 1, wherein the support is carbon.

9. The catalyst of claim 1, wherein the catalytically active metal (B) is platinum.

10. The catalyst of claim 1, wherein the catalytically active metal (B) is palladium.

11. The catalyst of claim 1, wherein a proportion of component (B) in the catalyst is in a range from 20 to 30% by weight, based on a total weight of components (A), (B), and (C).

12. The catalyst of claim 1, wherein a proportion of the at least one metal of the oxide (C) in the catalyst is in a range from 0.1 to 0.65% by weight, based on a total weight of components (A), (B), and (C).

13. The catalyst of claim 1, wherein a proportion of the at least one metal of the oxide (C) in the catalyst is in a range from 0.2 to 0.6% by weight, based on a total weight of components (A), (B), and (C).

14. The catalyst of claim 1, wherein a proportion of component (A) in the catalyst is in a range from 69.1 to 79.99% by weight, based on a total weight of components (A), (B), and (C).

15. The catalyst of claim 1, wherein a proportion of (C), based on the proportion of metal thereof, in the catalyst is in a range from 0.01 to 0.2% by weight, based on a total weight of components (A), (B), and (C).

16. The catalyst of claim 5, wherein component (C) additionally comprises an oxide of at least one metal selected from the group consisting of Si, Zn, Ta, Nb, and Cr.

17. A catalyst, comprising:
(A) a support;
(B) at least one catalytically active metal selected from the group consisting of rhodium, iridium, nickel, palladium, platinum, copper, silver, and gold, or an alloy comprising at least one of said catalytically active metals; and
(C) only one oxide of at least one metal selected from the group consisting of Ti, Sn, Si, W, Mo, Zn, Ta, Nb, V, Cr, and Zr,
wherein, based on a total weight of components (A), (B), and (C):
a proportion of the at least one metal of the only one oxide (C) is in a range from 0.01 to 0.9% by weight;
a proportion of component (B) is in a range from 10 to 50% by weight; and
a proportion of component (A) is in a range from 49.1 to 89.99% by weight.

18. A process for producing the catalyst of claim 1, the process comprising:

(a) depositing a compound comprising at least one catalytically active metal selected from the group consisting of rhodium, iridium, nickel, palladium, platinum, copper, silver, and gold on a support;
(b) depositing a hydrolyzable precursor compound comprising at least one metal oxide selected from the group consisting of Ti, Sn, Si, W, Mo, Zn, Ta, Nb, V, Cr and Zr on the support; and
(c) heat-treating the support,
wherein (a) and (b) are carried out in succession in any order or in parallel, and
wherein (c) is carried out at least twice at a different temperature, the temperature being increased in each successive heat treatment.

19. The process of claim 18, further comprising, after (a):
mixing the support, which has been coated with a catalytically active metal, with at least one selected from the group consisting of a second catalytically active metal and at least one transition metal,
wherein (b) and (c) are subsequently carried out in any order.

20. The process of claim 18, wherein the compound comprising the catalytically active metal is $Pt(NO_3)_2$.

21. The process of claim 18, wherein (c) is carried out under a reducing atmosphere.

22. The process of claim 18, wherein the reducing atmosphere comprises hydrogen.

23. The process of claim 18, wherein the temperature in (c) is in a range from 90 to 900° C.

* * * * *